(12) United States Patent
Velke et al.

(10) Patent No.: US 7,364,169 B2
(45) Date of Patent: Apr. 29, 2008

(54) WALK-BEHIND LAWN MOWER

(75) Inventors: James D. Velke, Germantown, MD (US); William R. Wright, Clarksburg, MD (US)

(73) Assignee: Wright Manufacturing, Inc., Frederick, MD (US)

(*) Notice: Subject to any disclaimer, the term of this patent is extended or adjusted under 35 U.S.C. 154(b) by 0 days.

(21) Appl. No.: 11/651,072

(22) Filed: Jan. 9, 2007

(65) Prior Publication Data

US 2007/0107403 A1  May 17, 2007

Related U.S. Application Data

(62) Division of application No. 10/712,261, filed on Nov. 14, 2003.

(51) Int. Cl.
*B62D 63/00* (2006.01)
*A01D 34/00* (2006.01)

(52) U.S. Cl. ......................... 280/32.7; 56/14.7

(58) Field of Classification Search ............... 180/19.1, 180/19.2, 19.3; 280/32.7; 172/433; 56/2, 56/14.7

See application file for complete search history.

(56) References Cited

U.S. PATENT DOCUMENTS

| | | | |
|---|---|---|---|
| 3,485,314 A | 12/1969 | Herr | |
| 4,096,920 A | 6/1978 | Heyn | |
| 4,920,733 A | 5/1990 | Berrios | |
| 5,004,251 A | 4/1991 | Velke et al. | |
| 5,483,787 A | 1/1996 | Berrios | |
| 5,575,140 A | 11/1996 | Bermes et al. | |
| 5,810,371 A | 9/1998 | Velke | |
| 5,882,020 A | 3/1999 | Velke | |
| 5,909,887 A | 6/1999 | Hobrath | |
| 5,947,505 A | 9/1999 | Martin | |
| 5,964,082 A | 10/1999 | Wright et al. | |
| 5,984,031 A | 11/1999 | Velke et al. | |
| 6,062,582 A | 5/2000 | Martin | |
| 6,145,855 A | 11/2000 | Bellis, Jr. | |
| 6,375,201 B2 | 4/2002 | Havener | |
| 6,485,036 B1 | 11/2002 | Bricko | |
| 6,488,291 B1 | 12/2002 | Bellis, Jr. | |
| 6,550,563 B2 | 4/2003 | Velke et al. | |
| 6,625,965 B2 | 9/2003 | Wright et al. | |
| 6,637,760 B1 | 10/2003 | Carman | |
| 6,640,526 B2 | 11/2003 | Velke et al. | |

OTHER PUBLICATIONS

U.S. Appl. No. 10/712,261, filed Nov. 14, 2003.

*Primary Examiner*—Lesley D. Morris
*Assistant Examiner*—Marc A. Scharich
(74) *Attorney, Agent, or Firm*—Nixon & Vanderhye P.C.

(57) ABSTRACT

A walk-behind lawn mower includes at least one of: (a) a latch assembly for receiving a folded-up sulky for storage during transport and the like; (b) inboard mounted control rods extending downwardly from a handle control assembly area of the mower, so that actuator shafts for the hydraulic pumps are located on inboard sides of the pumps so as to oppose one another; (c) a handle control assembly for allowing the mower to be operated in an efficient manner with operator comfort during turns and the like; and/or (d) a pump lock-out system including a lever(s) for actuating both a braking force to be applied to at least one wheel of the mower and a pump lock-out system for causing the pumps to be locked in a neutral position.

11 Claims, 13 Drawing Sheets

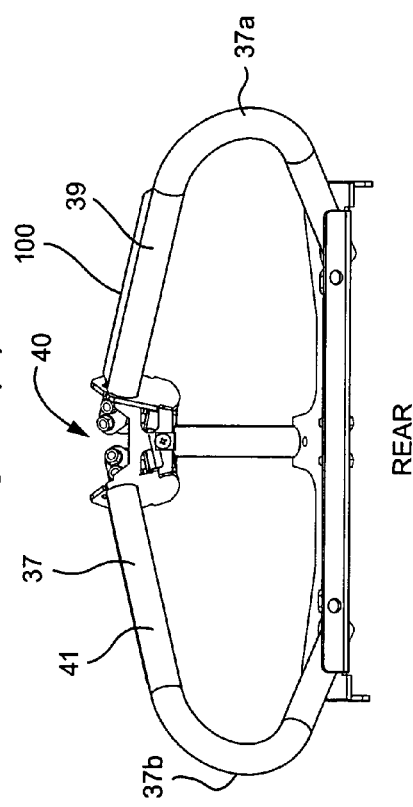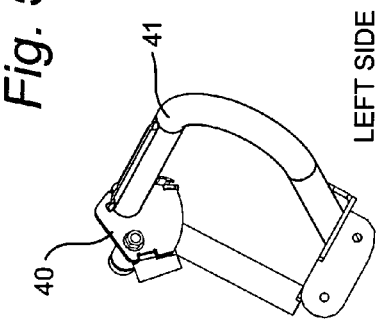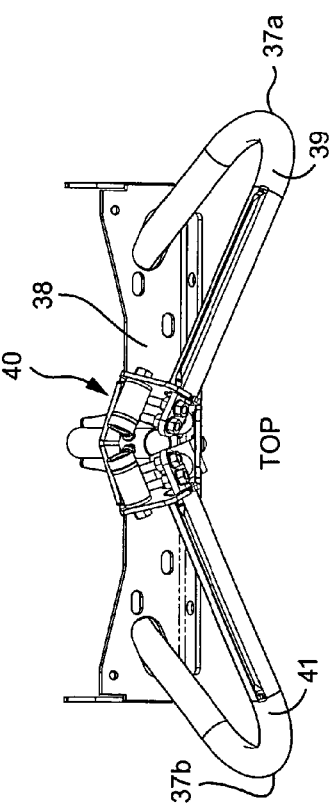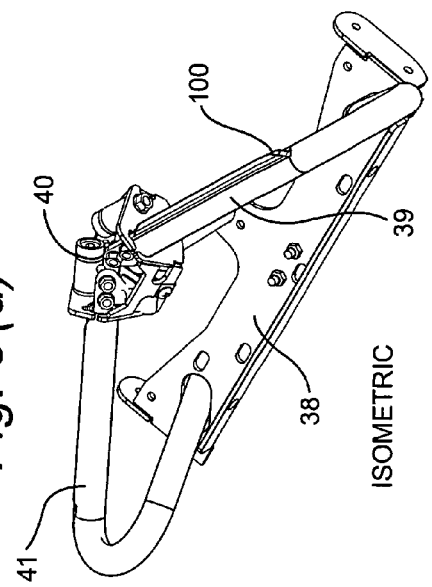

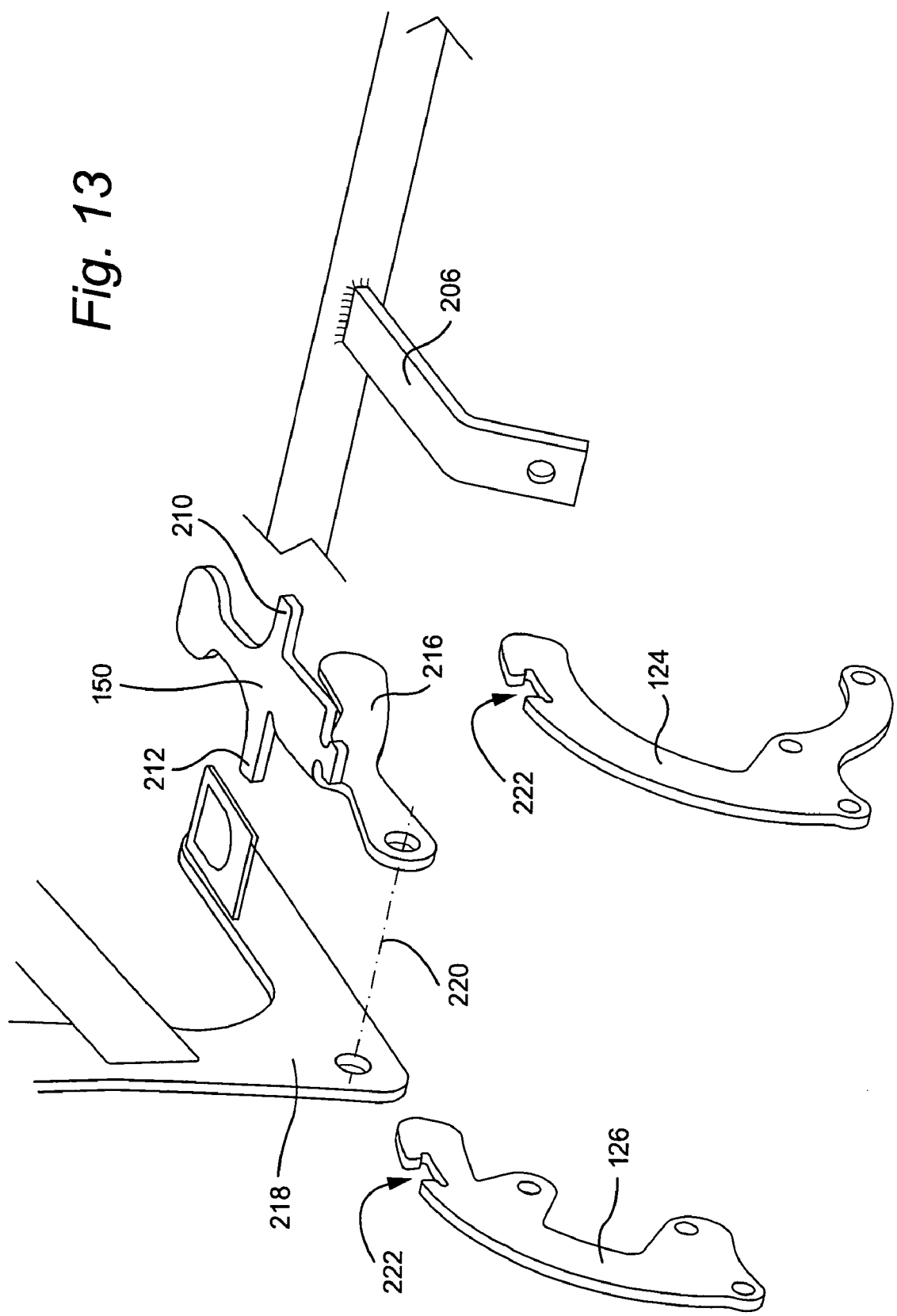

WALK-BEHIND LAWN MOWER

This application is a divisional of application Ser. No. 10/712,261, filed Nov. 14, 2003, the entire content of which is hereby incorporated herein by reference in this application.

This application relates to a walk-behind lawn mower. For example, certain example embodiments of this invention relate to a walk-behind lawn mower including at least one of: (a) a latch assembly for receiving a folded-up sulky for storage during transport and the like, so that the sulky may be folded up into a storage position without being removed from the mower; (b) inboard mounted control rods extending downwardly from a handle control assembly area of the mower, so that actuator shafts for corresponding pumps are each located on respective inboard sides of the pumps so as to oppose one another; (c) a unique handle control assembly for allowing the mower to be operated in a more efficient manner with improved operator comfort during turns and the like; and/or (d) a pump lock-out system including a lever(s) wherein actuation of the lever causes both a braking force to be applied to at least one wheel of the mower and pumps of the mower to be locked in a neutral position.

BACKGROUND OF THE INVENTION

Walk-behind mowers are known in the art. For example, and without limitation, walk-behind mowers are disclosed in each of U.S. Pat. Nos. 4,920,733, 5,483,787, and 5,004,251, the disclosures of which are all hereby incorporated herein by reference. A walk-behind mower is typically operated by an operator who either walks behind the mower during mower operation or rides on a sulky that is pulled behind the mower during mower operation. Example sulkies are disclosed in U.S. Pat. Nos. 5,004,251 and 5,882,020 (each to Velke), the disclosures of which are hereby incorporated herein by reference. Sulkies, to be pulled behind mowers during normal mower operation, may be of the one-wheel type or the two-wheel type.

While walk-behind mowers are known and used in the art, there is room for improvement with regard to the same.

BRIEF SUMMARY OF EXAMPLE EMBODIMENTS OF INVENTION

Certain embodiments of this invention relate to a walk-behind power lawn mower that may be operated either by an operator walking behind the mower or an operator supported by a sulky trailing behind the mower. Certain embodiments relate to a walk-behind lawn mower including one or more of: (a) a latch assembly for receiving a folded-up sulky for storage during transport and the like; (b) inboard mounted control rods extending downwardly from a handle control assembly area of the mower, so that actuator shafts for corresponding pumps are each located on respective inboard sides of the pumps so as to oppose one another; (c) a handle control assembly for allowing the mower to be operated in a more efficient manner with improved operator comfort during turns and the like; and/or (d) a pump lock-out system including a lever(s) wherein actuation of the lever causes both a braking force to be applied to at least one wheel of the mower and pumps of the mower to be locked in a neutral position during application of such braking force.

In certain example embodiments of this invention, there is provided a walk-behind lawn mower comprising: an engine for driving at least one cutting blade; and a latch assembly for receiving part of a sulky attached to the mower, wherein the latch assembly includes a pivotal spring-biased latch having a recess defined therein, wherein the recess of the latch is adapted to receive a protruding member of a sulky when a sulky is folded up from a deployed position to a stowed position so that the latch assembly of the mower can hold the folded up sulky in the stowed position.

In other example embodiments of this invention there is provided a walk-behind mower comprising: first and second rear drive wheels selectively drivable in opposite directions so as to allow zero radius turns to be performed when the first and second rear drive wheels are driven in opposite directions at approximately the same speed at the same time; first and second hydraulic pumps for controlling the first and second drive wheels, respectively; first and second elongated control rods operatively coupled between a handle control assembly and the first and second pumps, respectively; wherein first and second actuator shafts of the first and second pumps, respectively, both located on inboard sides of the first and second pumps so that the first and second shafts face one another.

In other example embodiments of this invention, there is provided a power lawn mower comprising: first and second drive wheels selectively drivable in opposite directions via first and second respective hydraulic pumps, wherein the hydraulic pumps control the driving speed and direction of the first and second drive wheels; a handle control assembly for allowing an operator to cause each of the first and second drive wheels to be independently controlled for operation in both forward and reverse directions, wherein the handle control assembly includes: a right hand forward control lever for controlling the first pump and the first drive wheel, a right hand reverse control lever for controlling the first pump and the first drive wheel, a left hand forward control lever for controlling the second pump and the second drive wheel, and a left hand reverse control lever for controlling the second pump and the second drive wheel; wherein the right hand forward control lever pivots about a first axis and the left hand forward control lever pivots about a second axis, wherein the first and second axes are not parallel to one another; a rigid handle member located between at least the right hand forward control lever and the right hand reverse control lever as viewed from above; wherein the right hand reverse control lever is of a length substantially less than a length of the right hand forward control lever so as to provide a gap on a forward side of the rigid handle member as viewed from above that allows an operator to rotate his or her hand around the rigid handle member without interference from the right hand reverse control lever. Left hand control levers may, of course, be interchanged with right hand control levers, in this embodiment; since this embodiment is applicable to the right hand levers, the left hand levers, or both in different embodiments of this invention.

BRIEF DESCRIPTION OF THE DRAWINGS

FIG. 5(a) is a rear plan view of the rigid portion (or weldment) of the handle control assembly of the mower of FIGS. 1-4, according to an example embodiment of this invention.

FIG. 5(b) is a side plan view of the rigid portion (or weldment) of the handle control assembly of the mower of FIGS. 1-4 as viewed from the left side of the mower, according to an example embodiment of this invention.

FIG. 5(c) is a top plan view of the rigid portion (or weldment) of the handle control assembly of the mower of FIGS. 1-4, according to an example embodiment of this invention.

FIG. 5(d) is an isometric view of the rigid portion (or weldment) of the handle control assembly of the mower of FIGS. 1-4, according to an example embodiment of this invention.

FIG. 13 is an exploded view of certain components of the pump lock-out system of FIGS. 10-12 according to an example embodiment of this invention.

DETAILED DESCRIPTION OF EXAMPLE EMBODIMENTS OF INVENTION

Figure 1:
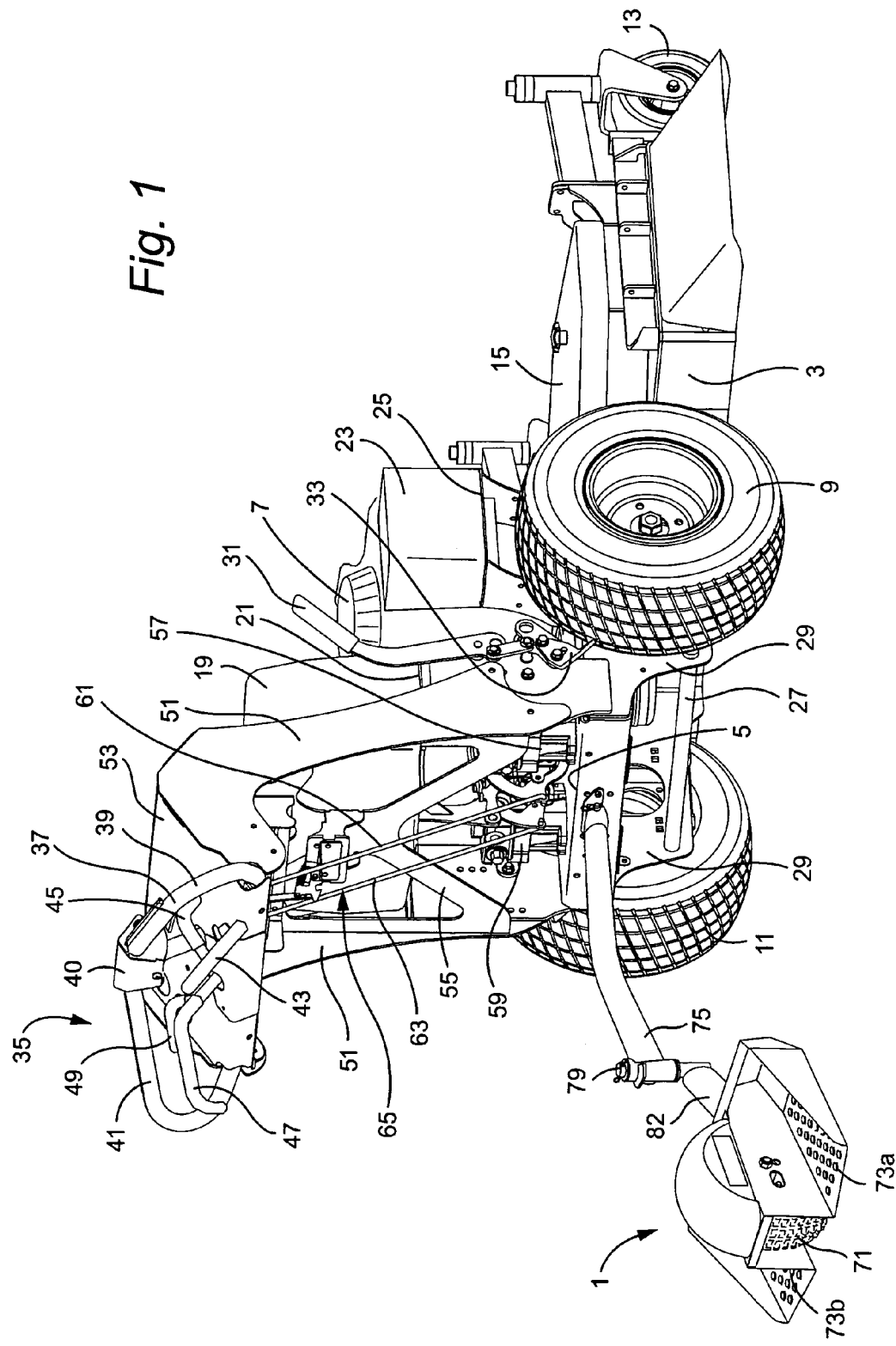
FIG. 1 is a perspective view illustrating an example walk-behind mower pulling a sulky therebehind during normal mower operation according to an example embodiment of this invention, so that the sulky is in a deployed position for supporting a mower operator.

Referring more particularly to the accompanying drawings in which like reference numerals indicate like parts throughout the several views.

Certain example embodiments of this invention relate to a walk-behind power lawn mower that may be operated either by an operator walking behind the mower or an operator supported by a sulky trailing behind the mower. For example, certain example embodiments of this invention relate to a walk-behind lawn mower including one or more of: (a) a latch assembly for receiving a folded-up sulky for storage during transport and the like, so that the sulky may be folded up into a storage position without being removed from the mower; (b) inboard mounted control rods extending downwardly from a handle control assembly area of the mower, so that actuator shafts for corresponding pumps are each located on respective inboard sides of the pumps so as to oppose one another; (c) a unique handle control assembly for allowing the mower to be operated in a more efficient manner with improved operator comfort during turns and the like; and/or (d) a pump lock-out system including a lever(s) wherein actuation of the lever causes both a braking force to be applied to at least one wheel of the mower and pumps of the mower to be locked in a neutral position.

FIG. 1 is a perspective view of a walk-behind self-propelled power mower according to an example embodiment of this invention, wherein a sulky 1 is being pulled behind the mower in a deployed position. The mower shown in FIG. 1 includes a cutter deck 3 for housing at least one cutting blade (now shown), an engine deck 5 for supporting a combustion engine 7 that powers the cutting bladed(s), first and second rear drive wheels 9 and 11, front pivotal castors 13, deck cover 15 for covering pulley systems 17 (see FIG. 2) and belt(s) which couple mechanical energy from the engine 7 to drive the blade(s), gas tank 19, gas tank support structure 21, battery 23 on battery support 25, support bar 27 extending between first and second vertical members 29 of the tractor frame, parking brake lever 31 which when pulled causes braking force to be applied to at least rear drive wheel 9 via brake shoe 33, handle control assembly 35 including rigid member 37 having both a right-hand rigid member 39 and a left-hand rigid member 41 that are fixedly connected to one another via connector 40, right forward control lever 43, right reverse control lever 45, left forward control lever 47, and left reverse control lever 49 (the right forward and reverse control levers 43 and 45 are rigidly connected to one another and pivot together relative to fixed or rigid member 39; whereas the left forward and reverse control levers 47 and 49 are rigidly connected to one another and pivot together relative to fixed or rigid member 41), support assembly 51 including a pair of support members extending upwardly at an angle from engine deck 5 so as to support the handle control assembly, dashboard 53, X-brace 55 for providing support between the support members 51, first and second hydraulic (or hydrostatic) pumps 57 and 59 for driving and controlling the driving direction of the first and second drive wheels 9 and 11 respectively, right control rod 61 operatively coupled between the right handle control members 43, 45 and the right pump 57, left control rod 63 operative coupled between the left handle control members 47, 49 and the left pump 59 so as to allow the handle control members to control operation of the pumps and thus the rear drive wheels 9, 11, and latch assembly 65 adapted to receive part of the sulky 1 thereby allowing the sulky to be stored in a stowed position during transport and the like.

In certain example embodiments of this invention, the mower is a zero-turning radius type walk-behind mower. Example zero radius turning mowers are described in each of U.S. Pat. Nos. 4,920,733, 5,964,082, 5,984,031, and 6,550,563, the disclosures of which are hereby incorporated herein by reference. A zero turning radius mower typically includes first and second drive wheels 9 and 11, each of which is independently drivable in both forward and reverse directions. The two drive wheels 9 and 11 may be provided along a common horizontal axis (but not axle) in certain example instances. To perform a zero radius turn, the first rear drive wheel is driven in the forward direction and the second rear drive wheel is driven in the rearward direction at the same time, thereby causing the mower to conduct a zero radius turn about a vertical axis that is located between the rear drive wheels. Each rear drive wheel (9 or 11) of a zero turning radius mower may be driven by its own hydraulic (or hydrostatic) pump (57 or 59), so that one pump is provided for each drive wheel.

Sulky 1 may be of the one wheel type or the two wheel type in different embodiments of this invention. In FIGS. 1-4, the sulky is of the one wheel type (e.g., see U.S. Pat. No. 5,004,251, incorporated herein by reference). The FIG. 1-4 example sulky includes a wheel 71 provided between platform portions 73a and 73b, a first rigid arm 75 to be pivotally connected to the rear of the mower via pivot axis 77, substantially vertical (i.e., vertical plus/minus 15 degrees during normal mower operation on flat ground) pivot axis 79 about which arm 75 and the platform can both pivot, optional rear arm 81 which pivots relative to axis 79 and is connected to the platform. During mower operation, the sulky 1 is pulled behind the mower and the mower operator may stand on platform 73a, 73b so as to avoid tiring during grass cutting operations. The wheel and fender covering the same are preferably sized so as to fit under front arm 75 when the platform pivots 360 degrees (or anything more than 180 degrees) about pivot 79 during mower operations such as when the operator steps off of the sulky and backs the mower up or conducts zero radius turns in one or two directions An operator may operate the mower with or without a sulky in different embodiments of this invention. It is noted that the sulky 1 be of the non-wheeled type in certain instances.

Figure 2:
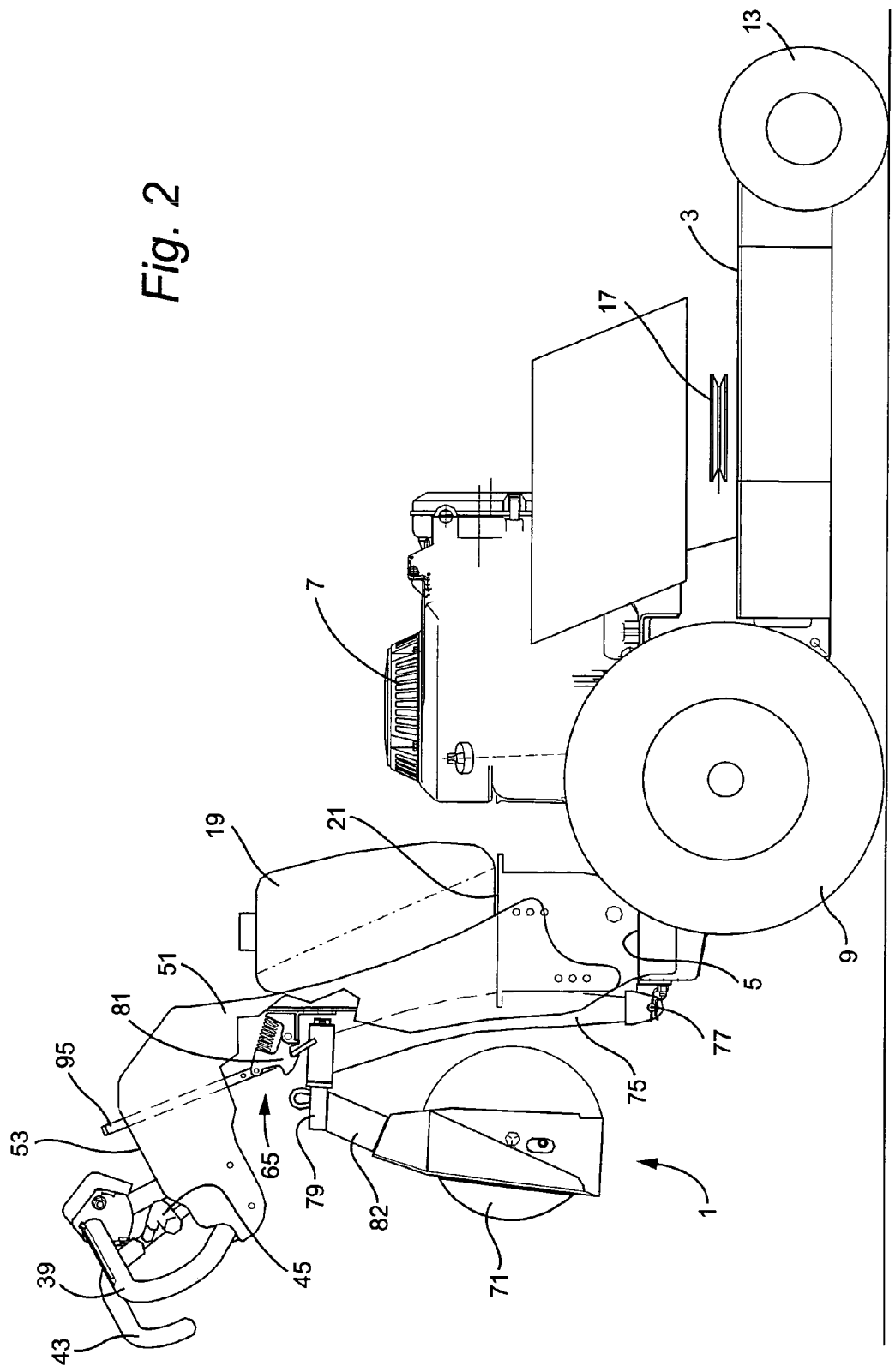
FIG. 2 is a side plan view of the mower of FIG. 1, where the sulky is in a stowed position.
Figure 3:
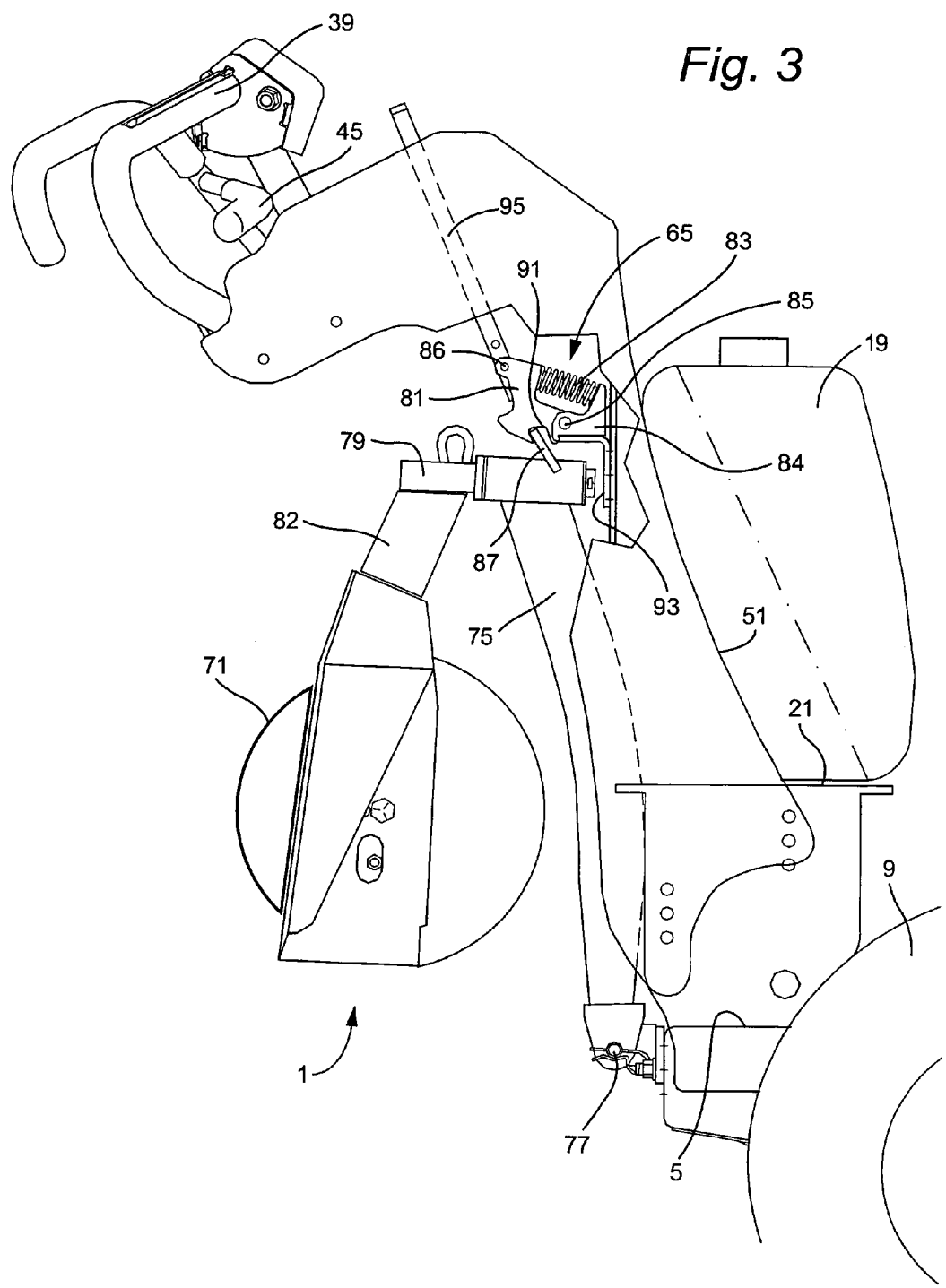
FIG. 3 is a close-up side plan view of the sulky latch assembly of the mower of FIGS. 1-2, where the sulky is in the stowed position.
Figure 4:
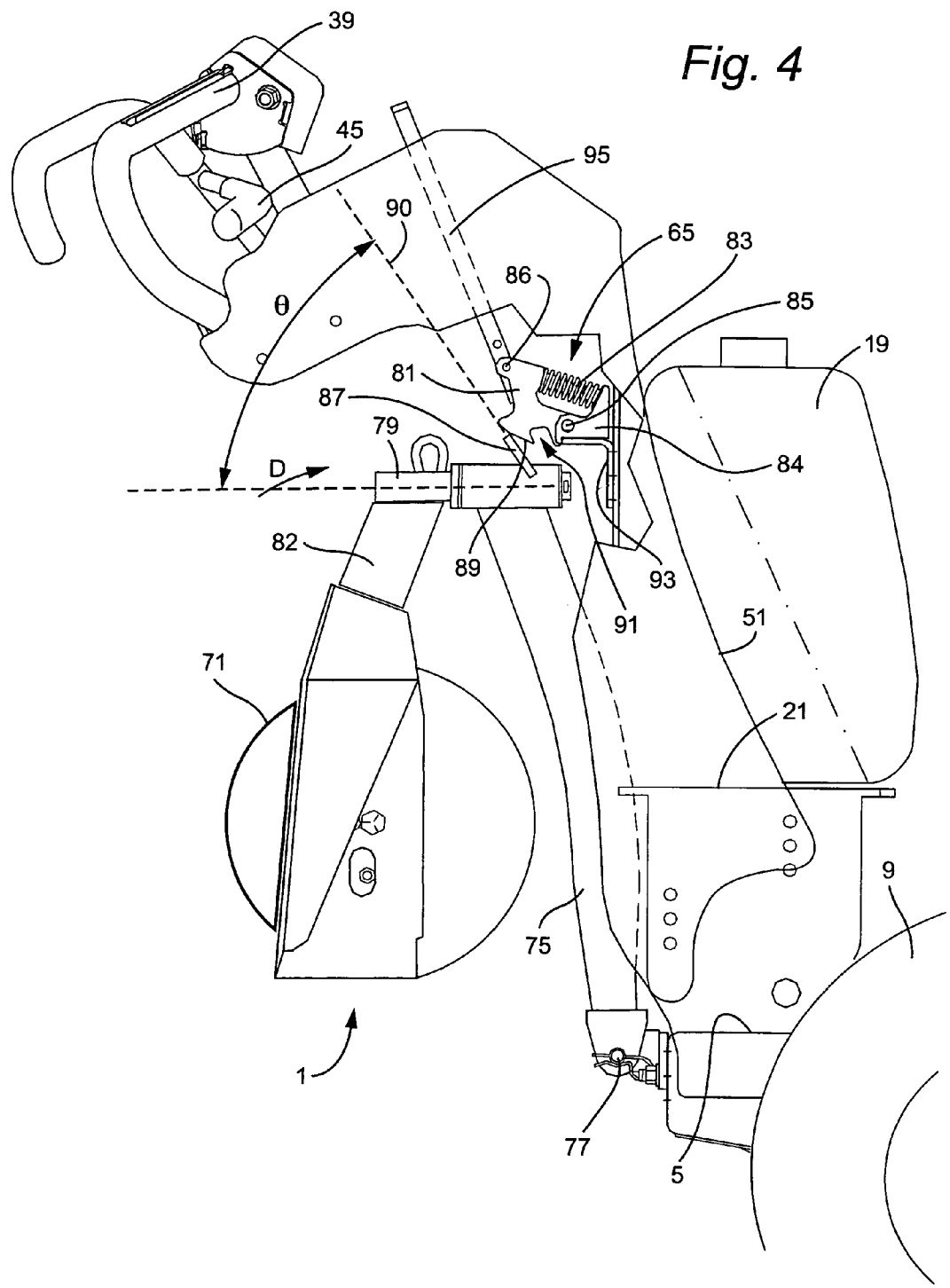
FIG. 4 is a close-up side plan view of the sulky latch assembly of the mower of FIGS. 1-3, where the sulky is moving in direction D toward the latch assembly and thus toward the stowed position.
Figure 6B:
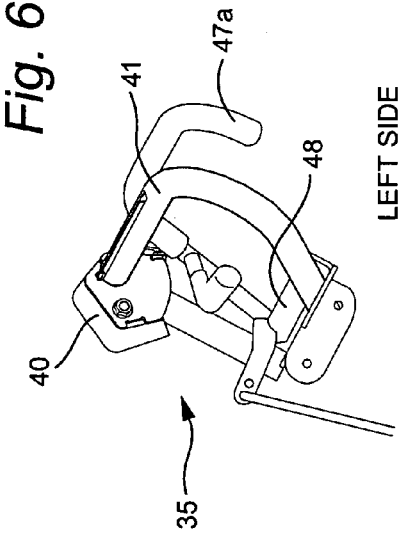
FIG. 6(b) is a side plan view of the handle control assembly of the mower of FIGS. 1-5, as viewed from the left side of the mower, in a neutral position.
Figure 6D:
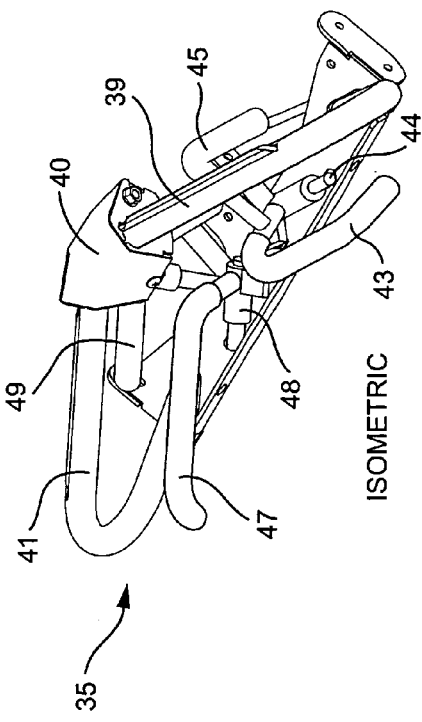
FIG. 6(d) is an isometric view of the handle control assembly of the mower of FIGS. 1-5, in a neutral position.
Figure 6A:
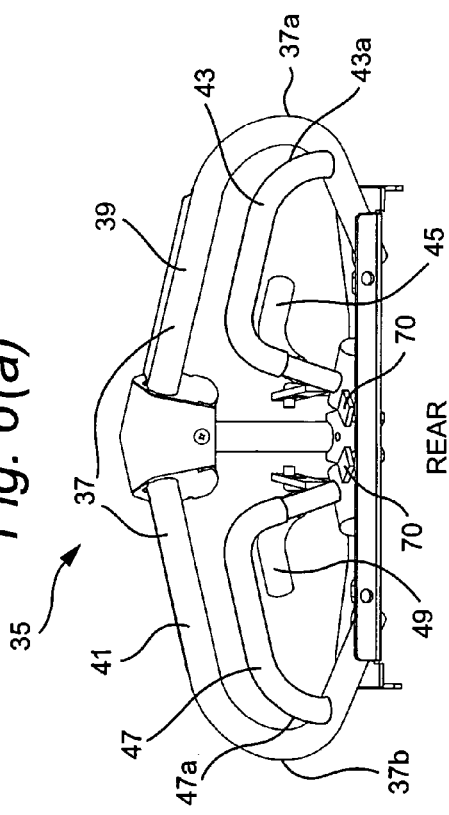
FIG. 6(a) is a rear plan view of the handle control assembly of the mower of FIGS. 1-5, in a neutral position.
Figure 6C:
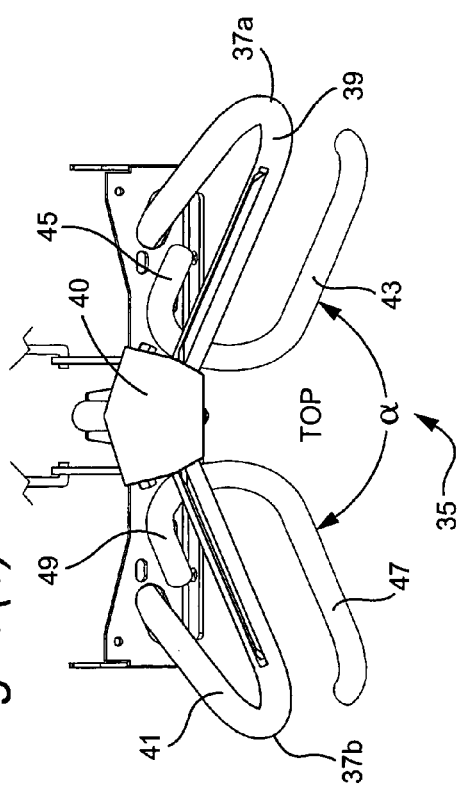
FIG. 6(c) is a top plan view of the handle control assembly of the mower of FIGS. 1-5, in a neutral position.

While FIG. 1 illustrates the sulky 1 in a deployed position, FIGS. 2-4 illustrate that the sulky may be easily stowed using latch assembly 65 during certain example embodiments of this invention. The latch assembly 65 includes a spring biased latch 81 that is by spring 83. Latch 81 pivots about pivot axis 85, and spring 83 biases latch in a direction so as to pivot counterclockwise about axis 85 as viewed from the right side of the mower as shown in FIGS. 2-4. Holding member 84 is provided for supporting both the spring 83 and the latch 81.

Referring to FIGS. 1-4, operation of the sulky receiving latch assembly will be described according to an example embodiment of this invention. When a user or operator decides to move the sulky 1 from a deployed position (see FIG. 1) to a stowed position (see FIGS. 2-3), the operator lifts the sulky off of the ground. When the sulky is lifted off of the ground, arm 75 pivots upwardly about axis 77 and the weight of the sulky wheel 71 and platform causes the platform 73a, 73b and wheel 71 together with arm 81 to pivot about axis 79 so that the platform 73a, 73b and wheel 71 hang below axis 79. Thus, with the wheel and platform hanging below axis 79 as the sulky is being moved toward the stowed position, the area of the sulky proximate axis 79 is the leading edge of the sulky moving toward the latch assembly 65.

FIG. 4 illustrates the sulky 1 being moved in direction D toward the latch assembly 65 in this regard, as the overall sulky is pivoting about axis 77 during such movement toward the latch assembly. It can be seen in FIG. 4 that a catch or protrusion 87 is rigidly affixed to the sulky proximate pivot axis 79. During normal mower operation when the sulky is being pulled behind the mower, the catch or protrusion 87 extends outwardly from axis 79 in a direction away from the mower. However, during pivoting of the sulky toward the stowed position as shown in FIG. 4, the catch or protrusion 87 represents a leading part of the sulky and comes into contact with an angled portion 89 (or latch ramp) of the latch 81 as shown in FIG. 4. When the catch or protrusion 87 hits angled portion (or ramp) 89 of the latch, this causes the latch to pivot clockwise (as viewed from the right side of the mower as shown in FIGS. 2-4) about axis 85 against the biasing force of spring 83 as the sulky continues its pivoting movement toward the stowed position. Finally, when the catch or protrusion 87 reaches recess 91 in the latch 81, the latch 81 is biased counterclockwise about axis 85 so that the catch or protrusion 87 ends up being located within recess 91 as shown in FIGS. 2-3 (i.e., stowed position). In this stowed position, the hook of the latch (the hook is provided at the end of the recess 91), or wall of the recess, prevents the catch 87 and thus the sulky from moving out of the stowed position (i.e., the spring 83 keeps the latch closed so that it will not inadvertently unlatch). In other words, in the stowed position as shown in FIGS. 2-3, the latch hook or recess wall prevents the catch 87 and thus the sulky from pivoting in the counterclockwise direction about axis 77. Recess 91 may be of any suitable shape. For example, recess 91 may be rectangular, or any other suitable shape so long as it can hold the sulky in place when desired.

It has surprisingly been found that the catch or protrusion 87 preferably extends away from axis 79 in a plane 90 so as to define an angle θ therebetween as shown in FIG. 4. In certain preferred embodiments, angle θ is from 20 to 75 degrees, more preferably from 30 to 70 degrees, and most preferably from 40 to 65 degrees. If the angle is too large, the weight of the sulky may cause the latch to open and deploy inadvertently.

Buttress plate 93 is provided laterally forward of the latch, and the leading edge of the metal pin defining axis 79 of the sulky is adapted to possibly hit buttress plate 93 when the sulky is moved into the stowed position so as to prevent damage to other parts of the mower. Thus, plate 93 prevents damage to other mower components if the sulky is flipped upwardly with excessive force. Buttress plate 93 may also be hit by the pin during mower transport or the like when the sulky is in the stowed position, again preventing damage to other parts of the mower.

When a user desires to move the sulky 1 from the stowed position (FIGS. 2-3) to a deployed position, the user simply pulls release member 95 upwardly. Release member 95 may be in the form of a rod, and is operatively coupled to latch 81 via deploy rod pivot 86, and extends through the dashboard so that it is easily accessible Spring 83 normally biases, along with the latch, the release member 95 downwardly due to pivot axis 86 so that the member 95 is normally biased toward a non-release position. However, when release member 95 is actuated (e.g., pulled upwardly against the biasing force of spring 83), this causes latch 81 to pivot clockwise about axis 85 thereby lifting the recess 91 away from catch or protrusion 87 so as to release the sulky 1. When the latch 81 is pivoted sufficiently clockwise about axis 85 in this regard, and the catch 87 is no longer held in recess 91, the weight of the sulky causes the sulky to drop to the ground as arm 75 pivots counterclockwise about axis 77 thereby causing the sulky to fall into a deployed position as the wheel thereof hits the ground (the tire cushions the fall).

It is noted that the term "rod" as used herein covers elongated members such as cross-sectionally round rods, cross-sectionally oval rods, cross sectionally flat bar type rods, and other cross sectionally shaped rods. In other words, "rod" means an elongated member, but does not require any specific cross-sectional shape. It is noted that the position of member 95 (which may be a rod) may be adjustable in different embodiments of this invention, so that its position may be changed if the wheels and/or handle bar assembly is raised/lowered.

Thus, the sulky latch assembly of certain example embodiments of this invention is highly advantageous in that it allows a sulky to be efficient stowed during transport or non-sulky mower operations in a manner that prevents the sulky from significantly swinging around. Moreover, deployment of a sulky from a stowed position to a deployed position is very easy, as a release member simply needs to be actuated. Accordingly, sulky storage, deployment and transport is made much easier for mower users/operators.

FIGS. 5-8 illustrate, among other things, a handle control assembly 35 according to an example embodiment of this invention. The handle control assembly 35 includes rigid member 37 having both a right-hand rigid member 39 and a left-hand rigid member 41 that are fixedly connected to one another via connector 40, right forward control lever 43, right reverse control lever 45, left forward control lever 47, and left reverse control lever 49. The right forward and reverse control levers 43 and 45 are rigidly connected to one another and pivot together about a common axis 44 relative to fixed or rigid member 39. Also, the left forward and reverse control levers 47 and 49 are rigidly connected to one another and pivot together about a common axis 48 relative to fixed or rigid member 41). Pivot axes 44 and 48 are defined by bars or rods connected to the handle levers. The right forward and reverse control levers 43 and 45 control right-hand pump 57 (and thus right rear drive wheel 9), whereas the left forward and reverse control levers 47 and 49 control left-hand pump 59 (and thus left rear drive wheel 11).

Reverse lever stop bolts 66, for each side of control lever, allow for adjusting of the reverse speed by limiting the reverse travel of each reverse control lever respectively; this adjustment may also be used for reverse tracking adjustment. Reverse stop tabs 70 are attached to the control levers and are adapted to hit/contact ends of bolts 66 so as to stop control lever movement and limit reverse speed. This reverse speed limiting assembly, including members 66 and 70 is effectively used to control the speed at which the mower may be operated in reverse. Similar stop bolts may be used for the forward control levers to control the speed at which the mower may be operated in forward.

For purposes of simplicity, FIGS. 5(a)-5(d) illustrate only the rigid member 37 which includes both right-hand rigid member 39 and left-hand rigid member 41 that are fixedly connected to one another via connector 40. The rigid member 37 is supported by base 38. An embedded deadman switch member 100 (which protrudes through an opening in the handle member) may be provided on one or both sides of the rigid member 37. The deadman switch functions to cut off the blades and/or engine of the mower if the operator takes both hands off of the rigid member 37. In particular, during mower operation the operator is gripping member 37 and is thus pressing downwardly on spring-biased deadman switch member 100 causing it to move inwardly. A deadman switch member 100 is preferably provided on both members 39 and 41. If the operator takes both hands off of the rigid member 37, the both deadman members 100 on members 39 and 41 will be released thereby causing the blades and/or engine of the mower to shut off. This is a safety mechanism. Pivots and switches associated with the deadman switch assembly are provided in housing 40 which functions also as a connector between members 39 and 41 of rigid member 37.

Figure 7A:
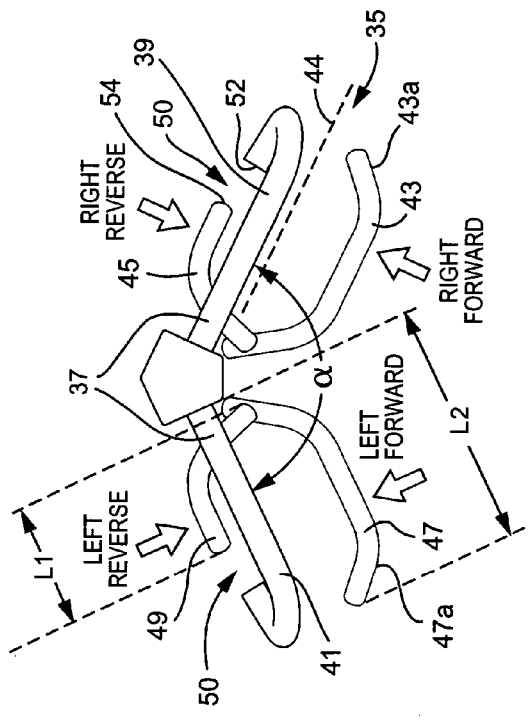
FIG. 7(a) is a top plan schematic view illustrating the handle control assembly of the mower of FIGS. 1-6.

Referring more particularly to FIGS. 6-7, an explanation will be provided as to how the operator may control the mower using the illustrated handle control assembly. FIGS. 6(a)-6(d) and 7(a) illustrate the handle control assembly in a neutral position. In other words, the handle control levers/members 43, 45, 47 and 49 are all biased toward their respective positions shown in FIGS. 6(a)-6(d) and 7(a) illustrate. When the handle control levers/members 43, 45, 47 and 49 are in this position, both pumps 57 and 59 and thus both drive wheels 9 and 11 are in neutral so that the mower will remain stationary on flat ground.

When an operator wants to cause the mower to move in a straight forward direction, the user grips both the right and left forward control levers/members 43 and 47, respectively, with his/her thumbs while gripping the rigid members 39 and 41 with his/her other fingers, and presses both the right and left forward control levers/members 43 and 47 forward toward the rigid members 39 and 41, respectively. Moving both forward control levers/members 43 and 47 forward at the same time and to approximately the same extent causes both drive wheels 9 and 11 to move forward at the same speed so that the mower moves straight forward (i.e., this causes both pumps to drive the wheels 9, 11 forward). Maximum forward speed is achieved when the forward levers 43 and 47 are pivoted forward until they contact and are stopped by rigid members 39 and 41, respectively. Intermediate speeds are achieved when the forward levers 43 and 47 are pivoted forward but not sufficiently to contact rigid members 39 and 41. It is noted that when forward control levers/members 43 and 47 are pivoted forward toward rigid members 39 and 41, reverse control levers/members 45 and 49 are also pivoted forward and away from the rigid members 39 and 41, since the forward and reverse levers on each side move together as one unit.

When an operator wants to cause the mower to move in a straight reverse direction, the user grips both the right and left hand rigid members 39 and 41 with his/her palms and pulls the right and left reverse control levers/members 45 and 49, respectively, backwardly so that they pivot toward rigid members 39 and 41, respectively. This causes both pumps to drive the wheels 9 and 11 in reverse, and may also be used for reverse tracking adjustments.

Zero radius turns about the vertical pivot axis are carried out by causing the right rear drive wheel 9 to be driven forward while at the same time the left rear drive wheel 11 is driven in reverse at approximately the same speed. This is done, for example, by moving lever 43 forward while at the same time moving lever 49 rearward toward the rigid handle member.

Figure 7C:
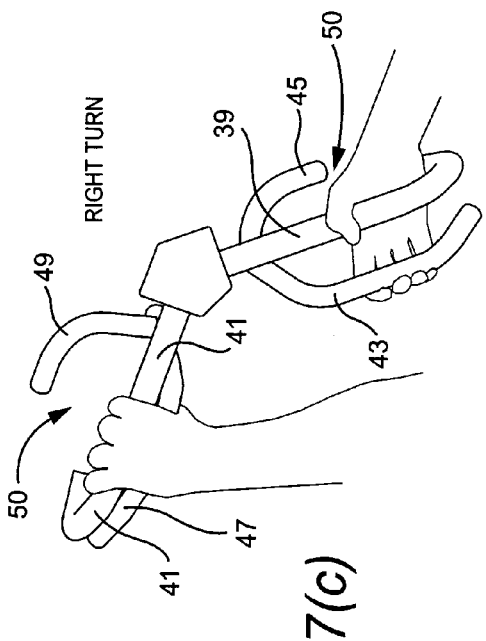
FIG. 7(c) is a top plan view of the handle control assembly of the mower of FIGS. 1-6 during a right-hand turn.
Figure 7B:
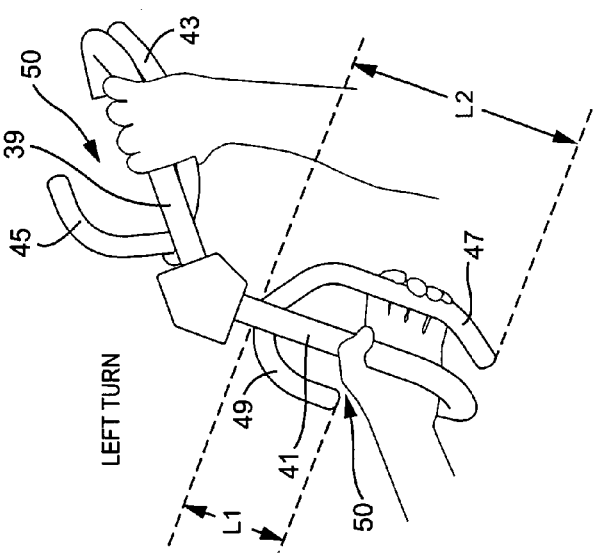
FIG. 7(b) is a top plan view of the handle control assembly of the mower of FIGS. 1-6 during a left-hand turn.

Handle assembly manipulation for a left turn is shown in FIG. 7(b). In particular, in order to conduct a left turn, right forward lever 43 is pivoted forward while the left levers 47 and 49 are in neutral. This cause the right rear drive wheel 9 to be driven forward (via pump 57), and the left rear drive wheel 11 to remain in neutral thereby causing the mower to turn left. Handle assembly manipulation for a right turn is shown in FIG. 7(c). In order to conduct a right turn, left forward lever 47 is pivoted forward while the right levers 43 and 45 are in neutral. This cause the left rear drive wheel 11 to be driven forward (via pump 59), and the right rear drive wheel 9 to remain in neutral thereby causing the mower to turn right.

Referring to FIG. 7 for example, it can be seen that the reverse levers 45 and 49 are not as long as their corresponding forward levers 43 and 47, respectively. Advantageously, this allows gaps 50 to be formed in areas to that the operator can rotate his/her hand forward during turns as shown in FIGS. 7(b) and 7(c) without his/her wrist or hand hitting the reverse levers 45, 49. This is highly advantageous during turns. In particular, during a left turn as shown in FIG. 7(b) for example, the user can rotate his/her left hand forward around the rigid member 41 without hitting reverse lever 49. This rotation of the left hand during a left turn of the mower (which is possible due to the design of the handle assembly herein) allows the user to also move his/her left elbow forward so that his/her left elbow will not jab him/her in the stomach or ribs during such turns which is a problem in the art. This allows for more comfortable and efficient mower operation. The handwork used in FIGS. 7(b) and 7(c) need not be used for all types of turns; they are particularly applicable to sharp turns such as substantial U-turns.

Likewise, during a right turn as shown in FIG. 7(c) for example, the user can rotate his/her right hand forward around the rigid member 39 without hitting reverse lever 45. This rotation of the right hand during a right turn of the mower (which is possible due to the design of the handle assembly herein) allows the user to also move his/her right elbow forward so that his/her right elbow will not jab him/her in the stomach or ribs during such turns which is a problem in the art. Again, this allows for more comfortable and efficient mower operation.

It can be seen from FIGS. 7(b)-7(c) that when the operator rotates his/her hand(s) forward around the rigid member 39 or 41 during a turn, the design of the handle control assembly with gaps 50 allows the user to perform such hand rotation to an extent sufficient to allow the user (or operator) to simultaneously grip the underside of the forward lever (43 or 47) with his/her finger tips on the side of the rotation. This is particularly advantageous in that it allows the user to squeeze his/her rotated hand and thus easily actuate the relevant drive wheel into forward movement when coming out of such turns, thereby allowing for smooth transitions to be made from sharp turns to new forward directional mower movement. Furthermore, gaps 50 due to the short length of reverse levers 45, 49 allow the user or operator to perform hand rotation prior to a turn to grip the underside of the forward lever (43 or 47) with his/her finger tips on the side of the rotation; thus, just prior to the turn the user can being to release the forward lever on the inner side of the turn with his/her rotated hand. Again, this allows for more efficient and comfortable turns.

In certain example embodiments of this invention, the reverse levers 45 and 49 are of lengths substantially shorter than their corresponding forward levers 43 and 47, respectively, in order to allow gaps 50 to be provided. In certain example embodiments, at least one of the reverse levers 45 and 49 is of a length L1 no greater than 75% of the length of the corresponding forward lever (43 and/or 47), respectively, more preferably of a length L1 no greater than 65% of the length of the corresponding forward lever, and most preferably no greater than 60% of the length of the corresponding forward lever. This allows for gaps 50 of sufficient size to be provided, so as to allow for easy hand rotation as described above without interference from the reverse lever(s). Moreover, in certain embodiments, rigid portion 39 (or 41) is of a length at least 30% longer than reverse lever 45 (or 49), more preferably at least 40% longer, and most preferably at least 50% longer; and may be of a length longer than the forward lever(s) in certain instances (e.g., see FIG. 7(a)).

In certain example embodiments, a gap 50 may be defined between an end 52 of a rigid member (39 or 41) and an end 54 of a corresponding reverse control lever (45 or 49) (e.g., see FIG. 7(a)). In certain example embodiments, such a gap(s) 50, as viewed from above the mower, is at least 3 inches wide, more preferably at least 4 inches wide, and most preferably at least 5 inches wide. These sizes permit ease of hand rotation through the gap(s) 50.

The rigid member 37 (i.e., 39 and 41) has rounded blunt ends 37a, 37b to reduce the likelihood of the operator being jabbed by the same during turns and the like. Moreover, the forward control levers 43 and 47 are bent near ends thereof (i.e., have rounded ends 43a, 47a) to help prevent the operator from being jabbed during turns and the like. Like the forward control levers 43, 47, the reverse control levers 45, 49 are bent in certain example embodiment of this invention as can be seen in the accompanying drawings.

In certain embodiments of this invention, the forward and reverse levers for a given side (i.e., right side, or left side) are substantially parallel to one another and pivot about a common axis. However, as shown in FIGS. 5-7 an angle α is defined between (a) the pivot axis of right-hand control levers 43, 45, and (b) the pivot axes of left-hand control levers 47, 49, as viewed from above. Approximately this same angle α is provided between a straight portion of right hand forward lever 43 and a straight portion of left hand forward lever 47 (see FIG. 6(c)). Approximately this same angle α is provided between a straight portion of right hand reverse lever 45 and a straight portion of left hand reverse lever 49. In certain example embodiments of this invention, it has advantageously been found that this angle(s) α should be less than 170 degrees, more preferably from 120 to 170 degrees, even more preferably from 130 to 165 degrees. This allows improved operator comfort and efficiency, and permit hand rotation to be performed in a more comfortable and efficient manner. In certain example embodiments of this invention, this same angle α may be defined between the very same components when viewed directly from the rear of the mower (e.g., see FIG. 9).

The handle control assembly described herein is optimized to allow for manhandling of the mower while also providing for ease and comfort of use for the operator. The control levers are designed to allow easy positioning during normal use and during any manhandling of the mower (e.g., pushing the handle assembly in any desired direction). The reverse levers are short in length to prevent interference when performing typical turning maneuvers. The handle control assembly is designed to withstand abuse and other forms of possible damage, and the rigid member 37 (i.e., 39 and 41) has rounded blunt ends to reduce the likelihood of the operator being jabbed by the same during turns and the like. Moreover, the forward control levers are bent near ends thereof to help prevent the operator from being jabbed during turns and the like.

FIGS. 1 and 8-11 illustrate another example embodiment of this invention relating to the elongated control rods, and the positioning thereof. In particular, as shown in FIGS. 8-11, the control rods 61 and 63 are inboard (as opposed to outboard) of the pumps 57 and 59, as viewed from behind the mower. This helps protect the rods 61, 63 from being damaged; often, the front wheels or castors of other mowers being loaded onto a trailer can hit conventional outboard control rods.

Figure 8:
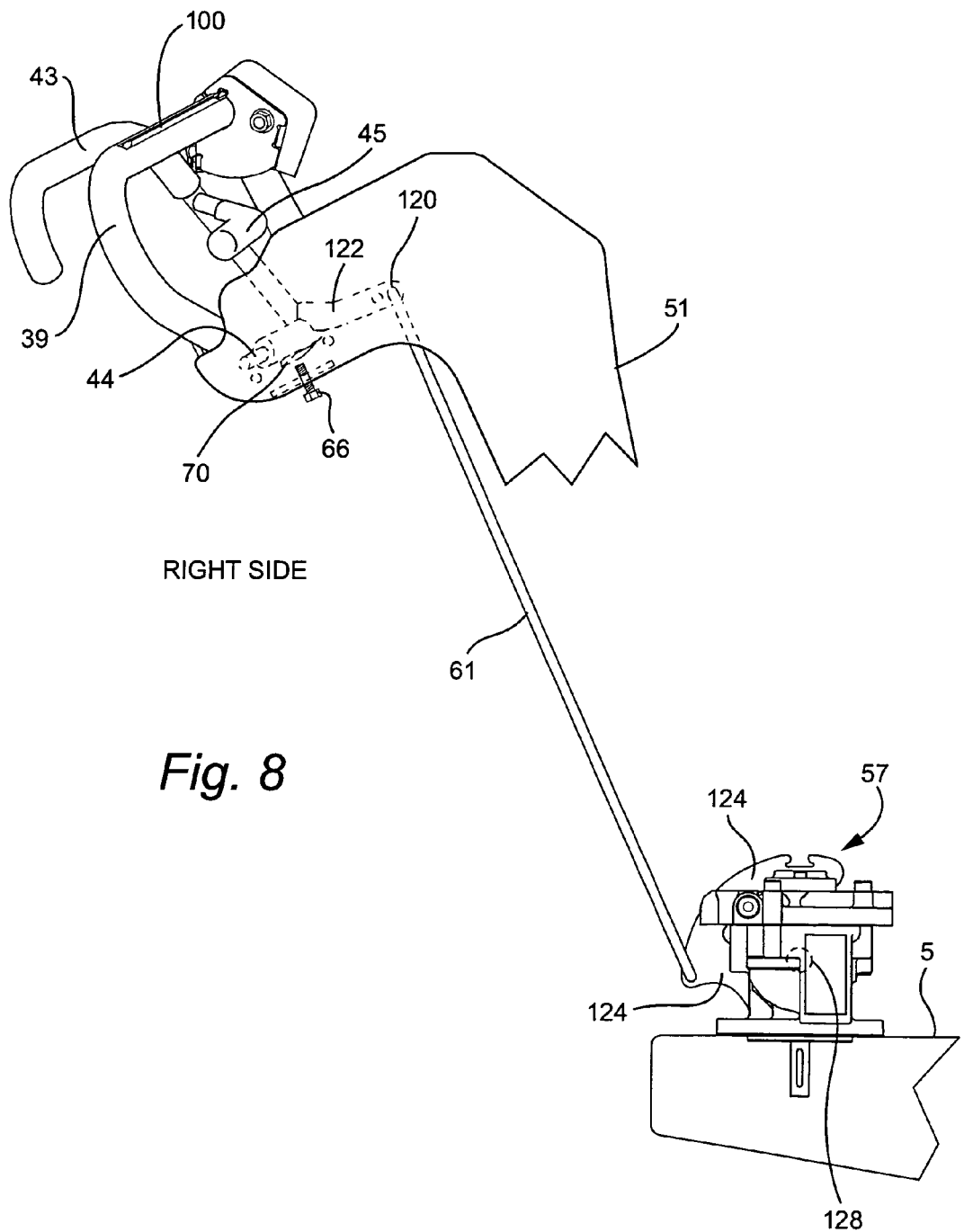
FIG. 8 is a side plan view of the steering control rod assembly of the mower of FIGS. 1-7, as viewed from the right side of the mower.

Referring to FIGS. 1 and 8-11, the control rods 61, 63 are operatively coupled to the handle control assembly in a pivotal manner (see pivot 120 in FIG. 8). For example, when the right hand forward lever 43 is pushed forward in FIG. 8, this causes member 122 to pivot clockwise about pivot axis 44 thereby causing right hand control rod 61 to move downwardly. This downward movement of the control rod 61 causes pump lever 124 to rotate about pump shaft axis 128 thereby causing the pump 57 to be activated and drive the rear drive wheel 9 in the forward direction. In a similar manner, when the left hand forward lever 47 is pushed forward, this causes the corresponding left-hand member 122 to pivot about pivot axis 48 thereby causing left hand control rod 63 to move downwardly. This downward movement of the control rod 63 causes pump lever 126 to rotate about pump shaft axis 130 thereby causing the left pump 59 to be activated and drive the left rear drive wheel 11 in the forward direction. Reverse operation are achieved when the reverse levers are pulled toward the rigid handle member which causes rods 61 and/or 63 to be moved upwardly thereby causing the pump levers 124, 126 to be rotated in the opposite directions.

Figure 9:
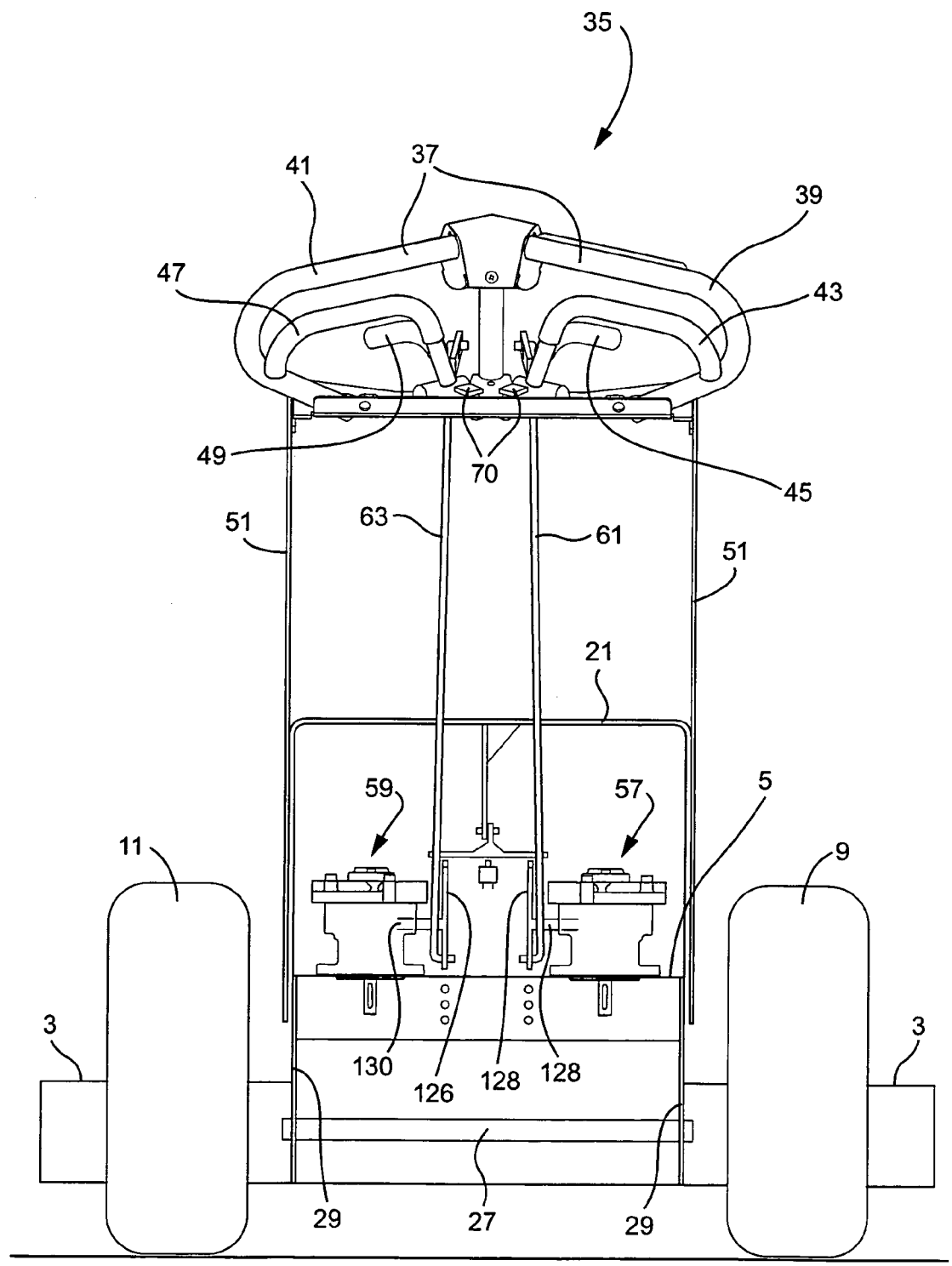
FIG. 9 is a rear view of the steering control rod assembly of the mower of FIGS. 1-7, as viewed from the rear of the mower.
Figure 10:
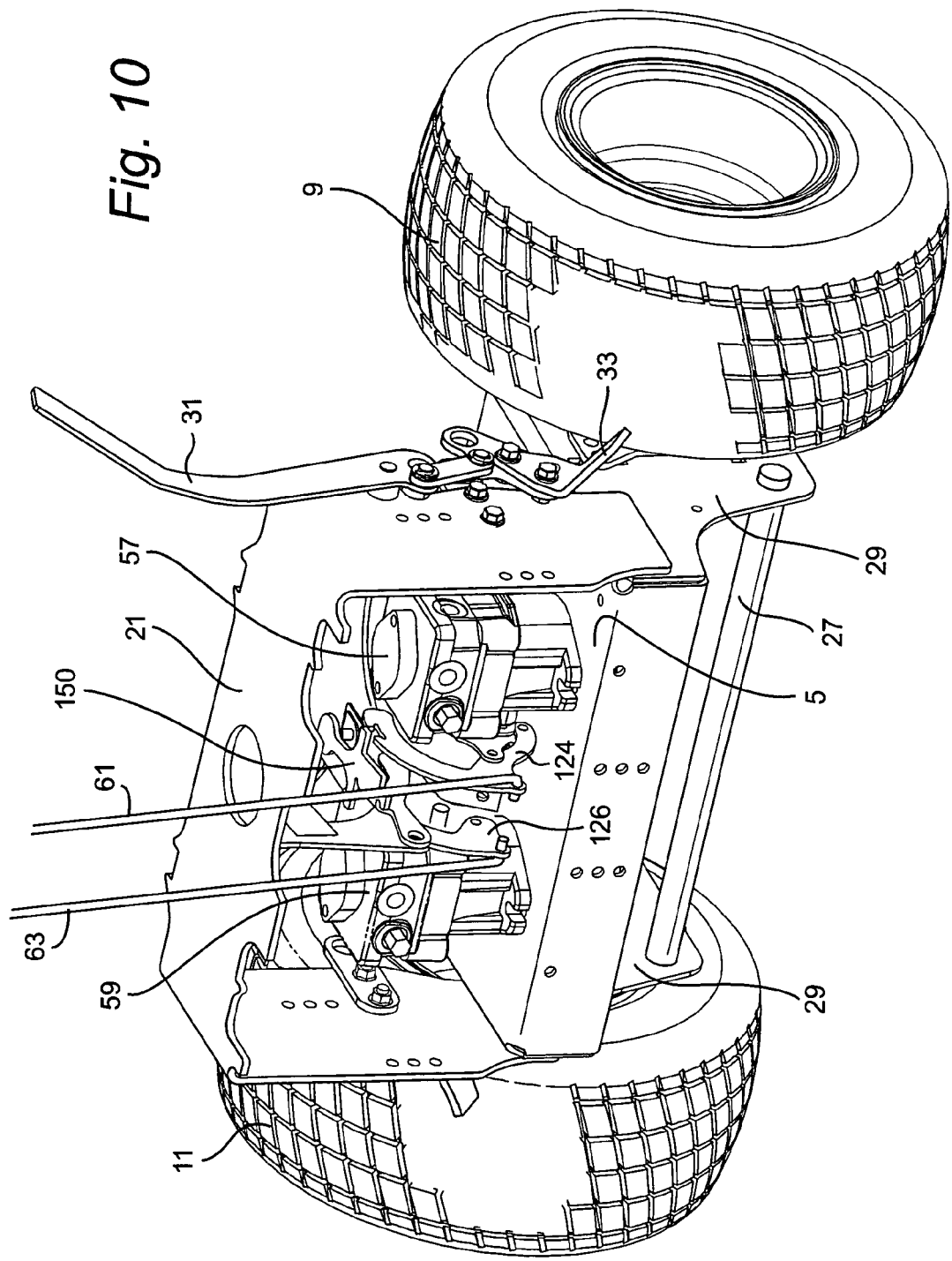
FIG. 10 is a close-up perspective view of the bottom portion of the steering control rod assembly, and the pump lock-out system, of the mower of FIGS. 1-9.
Figure 11:
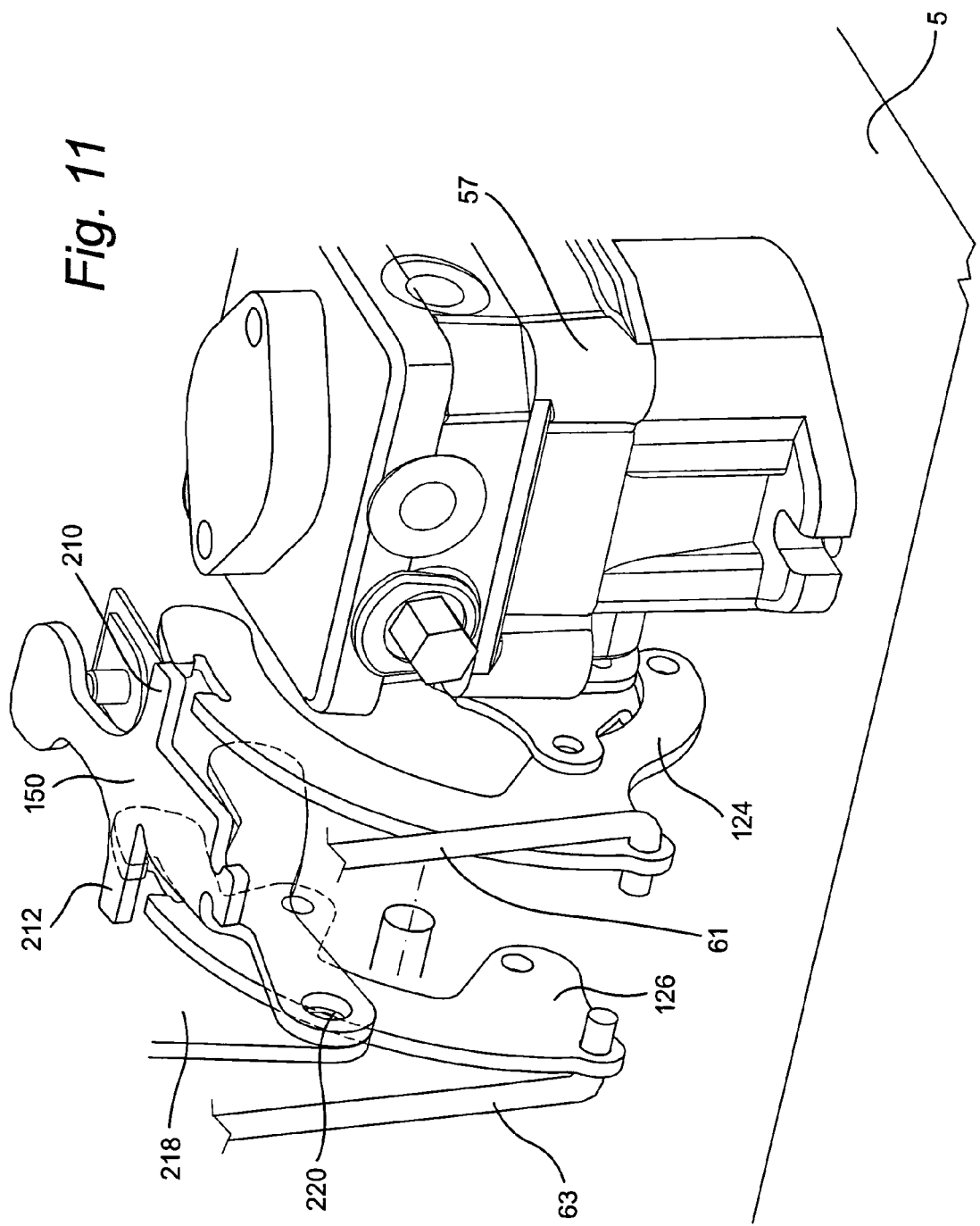
FIG. 11 is a close-up view of a portion of the pump lock-out system of the mower of FIGS. 1-10.

As best shown in FIGS. 9-11, the control rods 61, 63 are located inboard of their respective pumps 57, 59. In other words, the pump control levers 124 and 126 for the pumps are both located on the interior sides of the pumps so as to face one another (i.e., not on the outer sides of the pumps facing the wheels as is conventional). This also means that the pump actuator shafts that define axes 128 and 130 are located on the inboard sides of the pumps and face one another (again, they are not on the outboard sides of the pumps facing the adjacent wheels as is conventional); the pump control levers 124 and 126 are rigidly connected (directly or indirectly) to the pump actuator shafts (for movement therewith) which define axes 128, 130. The illustrated pump control levers 124 and 126 are provided for purposes of example only and are not intended to be limiting; as any suitable type of return-to-neutral device/system may be used to actuate/deactuate each pump.

Because the control rods 61, 63 are inboard (as opposed to outboard), the pump control levers face one another and are advantageously close to each other thereby allowing the pump lock-out system (see discussion below) to be more efficiently designed (e.g., fewer parts and/or less space needed for the lock-out system). However, in certain example embodiments of this invention, the control rods 61 and 63 are still at least about 2 inches apart, more preferably at least 3 inches apart, and most preferably at least 3.5 inches apart, so as to allow the sulky to fit therebetween during the aforesaid sulky stowing operation. However, in certain embodiments of this invention, the control rods 61 and 63, in an area proximate the middle of the mower height, are no further than about 8 inches apart, more preferably no further than about 6 inches apart, and most preferably no further than about 5 inches apart, with the centerline of the mower being located therebetween as viewed from the rear of the mower. Furthermore, this positioning of control rods 61 and 63 allows x-brace 55 (see FIG. 1) to be used for support purposes without interfering with the desired path of the control rods.

FIGS. 1 and 10-13 illustrate a pump lock-out system according to an example embodiment of this invention. Pump lock-out systems are known in the art. For example, see U.S. Pat. Nos. 5,984,031 and 6,550,563, the disclosures of which are hereby incorporated herein by reference. The pump lock-out system according to certain embodiment of this invention is designed so that the pump lock-out system is engaged by activation of the brake lever 31. In particular, the pump lock-out system is engaged along with braking force applied by an operator, so that when braking force is applied to at least one wheel of the mower the pump lock-out system is also engaged and prevents at least one of the pumps 57, 59 from being changed from a neutral state during application of the braking force.

The pump lock-out system according to certain embodiments of this invention is particularly advantageous in that it allows both the right and left pumps 57 and 59 to be "locked" in a neutral state through the engagement of a single engaging member 150 which may be selectively engaged. In particular, the single engaging member 150, when engaged, becomes engaged with the pump control levers 124 and 126 for both pumps 57 and 59. Thus, a separate engaging member is not needed to each pump. This allows the pump lock-out system to be more compact and efficient than in certain prior art designs. Space is also saved since much of the pump lock-out system is located in the space between the pumps 57, 59.

Figure 12:
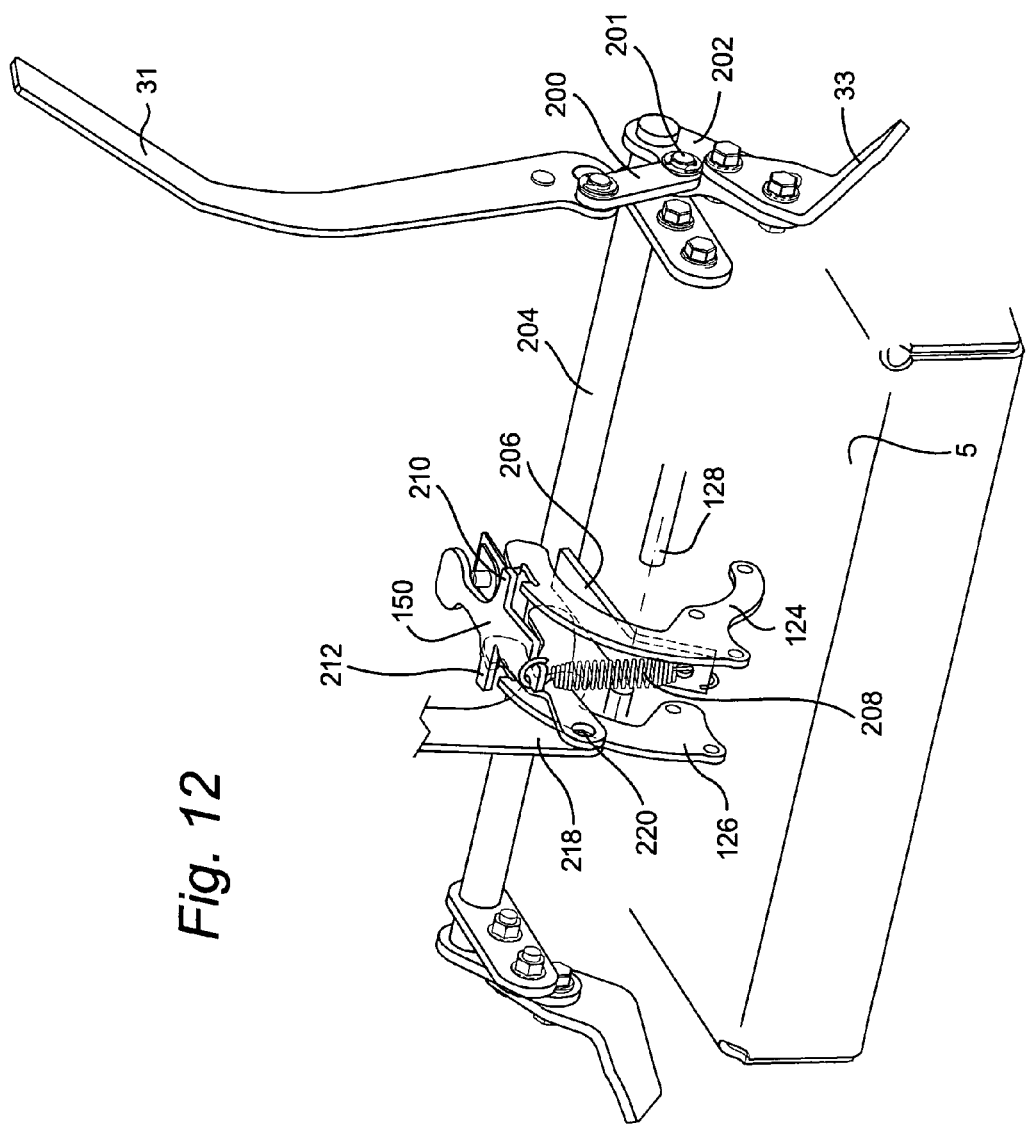
FIG. 12 is a close-up view of a portion of the pump lock-out system of the mower of FIGS. 1-11.

Referring to FIGS. 10-13, the pump lock-out system includes lever 31 that is pivotally connected to link 200, which in turn is pivotally connected to brake shoe support 202. Brake shoe 33 is rigidly attached to, or integral with, support 202. Moreover, support 202 is rigidly attached to, or integral with, horizontally extending rotatable shaft 204. Still referring to the pump lock-out system, a rigid flat bar-shaped protrusion 206 is rigidly affixed to or integral with rotatable shaft 204; and spring 208 is connected between an end of protrusion 206 and an end or other suitable portion of engaging member 150. Engaging member 150, as best shown in FIGS. 11-13, includes first and second engaging protrusions 210 and 212 for selective engagement with respective recesses in pump control levers 124 and 126, respectively, and also includes a cam portion 216 adapted to be contacted by protrusion 206 in order to unlock the pumps from the neutral state. Member 150 is pivotally connected to support 218 at pivot axis 220.

An example operation of the pump lock-out system according to FIGS. 1 and 10-13 is as follows. Whenever the brake lever (or some other lever) 31 is not engaged, the brake shoe 33 is not engaged and the pumps 57, 59 are not locked in a neutral state. However, when the operator pulls the brake lever 31 rearwardly toward the rear of the mower, this causes link 200 to rotate counterclockwise about axis 201 as viewed from the right side of the mower thereby causing brake shoe support 202 and brake shoe 33 to rotate counterclockwise along with shaft 204 into engagement with the left rear wheel 9 of the mower. Thus, braking force is applied to the left rear drive wheel 9, via shoe 33. Additionally, this same rearward pulling of the lever 31 causes shaft 204 and protrusion 206 thereon to rotate counterclockwise as viewed from the right side of the mower; this causes the end of protrusion 206 to pull the lower end of spring 208 downwardly toward the ground thereby also pulling downwardly engaging member 150. When engaging member 150 is pulled downwardly in such a manner by spring 208 due to the rotation of shaft 204, engaging protrusions 210 and 212 are also pulled downwardly into the corresponding illustrated recesses defined along the respective top edges of the pump control levers 124 and 126. When protrusions 210 and 212 of engaging member 150 have entered the respective recesses 222 defined in the pump control levers 124 and 126, this effectively locks the levers 124 and 126 in place and prevents them from significantly moving thereby locking the corresponding pumps 57 and 59 in the neutral state.

When it is desired to unlock the pumps from the neutral state, or disengage the brake force applied to the mower wheel(s), the operator moves lever 31 forward. This causes shoe 33 to disengage from the left rear drive wheel 9. This movement of the lever 31 also causes shaft 204 and protrusion 206 thereon to rotate clockwise as viewed from the right side of the mower. When protrusion 206 rotates in such a manner, the protrusion effectively moves upwardly and comes into contact with cam portion 216 of the engaging member 150 thereby pushing the engaging member 150 upwardly and dislodging the protrusions 210 and 212 from recesses 222 of the pump control levers. In other words, the protrusions 210 and 212 are moved upwardly out of recesses 222, thereby unlocking the pump control levers 124 and 126 and thus the pumps 57 and 59.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A walk-behind lawn mower comprising:
   an engine for driving at least one cutting blade;
   a sulky attached to the mower, wherein the sulky comprises a substantially vertical pivot axis structure which is aligned substantially vertical relative to the ground during normal sulky operation when the sulky trails behind the mower, wherein a foot platform of the sulky pivots relative to a front arm of the sulky about a pivot axis defined by the substantially vertical pivot axis structure;
   a latch assembly for receiving a protruding part of a sulky attached to the mower, the protruding part protruding from the substantially vertical pivot axis structure of the sulky, wherein the latch assembly includes a pivotal spring-biased latch having a recess defined therein, wherein the recess of the latch is adapted to receive the protruding part of the sulky when the sulky is folded up from a deployed position to a stowed position so that the latch assembly of the mower can hold the folded up sulky in the stowed position;
   a buttress plate located laterally forward of the latch, so that a leading portion of the substantially vertical pivot axis structure of the sulky is adapted to hit the buttress plate when the sulky is moved into the stowed position with excessive force; and
   a release member operatively coupled to the latch assembly, wherein the release member extends upwardly from the latch assembly through a dashboard of the mower so that when an operator actuates the release member the latch assembly releases the sulky from the stowed position so that the sulky drops to the ground.

2. The mower of claim 1, wherein the release member comprises an elongated rod including a curved top end, and when an operator pulls the rod upwardly this causes the latch assembly to release the sulky from the stowed position so that the sulky drops to the ground.

3. The mower of claim 1, wherein the latch assembly is located under a dashboard of the mower.

4. The mower of claim 1, wherein the protruding member extends outwardly from the substantially vertical pivot axis structure of the sulky so as to define an angle $\theta$ of from about 20 to 75 degrees with a vertical pivot axis of the sulky.

5. The mower of claim 4, wherein the protruding member extends outwardly from the substantially vertical pivot axis structure of the sulky so as to define an angle $\theta$ of from about 30 to 70 degrees with the vertical pivot axis of the sulky.

6. The mower of claim 4, wherein the protruding member extends outwardly from the substantially vertical pivot axis structure of the sulky so as to define an angle $\theta$ of from about 40 to 65 degrees with the vertical pivot axis of the sulky.

7. The mower of claim 1, wherein the protruding member is located in an approximately laterally central portion of the sulky during normal mower operation when the sulky is in the deployed position.

8. A walk-behind lawn mower comprising:
   an engine for driving at least one cutting blade;
   a latch assembly for receiving part of a sulky attached to the mower, wherein the latch assembly includes a pivotal spring-biased latch having a recess defined therein, wherein the recess of the latch is adapted to receive a protruding member of a sulky when a sulky is folded up from a deployed position to a stowed position so that the latch assembly of the mower can hold the folded up sulky in the stowed position;
   wherein the protruding member extends outwardly from a normally vertical pivot axis of the sulky so as to define an angle $\theta$ of from about 30 to 70 degrees with the vertical pivot axis of the sulky; and
   a release member operatively coupled to the latch assembly, wherein the release member extends upwardly from the latch assembly through a dashboard of the mower so that when an operator actuates the release member the latch assembly releases the sulky from the stowed position so that the sulky drops to the ground.

9. The mower of claim 8, further comprising a buttress plate located laterally forward of the latch, so that a leading portion of the sulky is adapted to hit the buttress plate when the sulky is moved into the stowed position with excessive force.

10. The mower of claim 8, wherein the protruding member extends outwardly from the normally vertical pivot axis of the sulky so as to define an angle $\theta$ of from about 40 to 65 degrees with the vertical pivot axis of the sulky.

11. The mower of claim 8, wherein the protruding member is located in an approximately laterally central portion of the sulky during normal mower operation when the sulky is in the deployed position.

* * * * *